United States Patent Office 3,545,862
Patented Dec. 8, 1970

3,545,862
MULTI-PULSE LASER RANGING SYSTEM
Sumner Ackerman, Lexington, Mass., assignor to EG & G,
Inc., Bedford, Mass., a corporation of Massachusetts
Filed Jan. 26, 1968, Ser. No. 700,954
Int. Cl. G01c 3/08
U.S. Cl. 356—5                                 5 Claims

ABSTRACT OF THE DISCLOSURE

Laser ranging system having an electro-optical Q-switched laser activated to produce a predetermined number of giant laser pulses during a single pumping period by a modulator triggered by an equal number of pulses furnished by a programmable pulse generator, and an oscilloscope display system whose sweep is controlled by the same pulses through a pulse delay circuit to display in an equal number of sweeps the noise and reflected laser signals detected by the receiver.

BACKGROUND, OBJECTS AND ADVANTAGES OF THE INVENTION

One of the scientific applications of laser technology is in the field of satellite geodesy, where the objective is to improve the accuracy with which points on the earth's surface are known with respect to each other. An important example is in the study of continental drifts. It is desired to measure the position of certain satellites relative to a terrestial station where the distances are generally on the order of 1,000 miles and the accuracy sought is about one part per million.

Several characteristics of lasers which impair or restrict their range measurement capabilities are (1) a low Q-switched mode efficiency, generally about 0.1%; (2) a susceptibility to damage at peak power outputs on the order of $10^9$ watts; and (3) saturation, or limited output, which varies widely with different laser rod materials and quality.

It is an object of the present invention to provide a laser range finding system for use in satellite geodesy which shall not be subject to the foregoing limitations.

This and other objects and advantages are achieved with a multi-pulsed laser range finding system designed to produce a plurality of giant laser pulses during a single laser pumping period. The multiple pulses are reflected by the target satellite and upon reception are correlated to constitute one range measurement event. Correlation is accomplished utilizing precise timing of the transmitted pulses.

The laser range finding system of the present invention was made in the course of work under Contract No. AF19 (628)–5516 with the United States Air Force.

One advantage of the system of the present invention is that the effective output of the laser is increased since more output energy can generally be obtained as the number of giant output pulses per pumping period is increased.

Another advantage of the present invention is that the limitations imposed on the laser output by damage thresholds and saturation at high peak powers are relieved.

Still a further advantage is that random errors are reduced by the average of more than one range determination for each range measurement event.

When the reflection pattern from an optically rough target due to each of the multiple pulses is statistically independent, the further advantage obtained is that the probability of detection is increased.

The foregoing advantages have been theoretically and experimentally investigated. It has been found that the output energy of a typical Q-switched ruby laser can be increased by a factor of more than 5:1 through the generation of multiple pulses during a single pumping period. More than ten (10) such giant pulses can be generated. Theoretical considerations indicate that the range for a given laser transmitter may thus be increased by over 50% and random error may be reduced by a factor of more than 1:3. As an example of protection against damage, the generation of five (5) giant pulses of 100 megawatts peak power is equivalent, under low noise conditions, to the generation of a single 500 megawatt peak power pulse. The laser will generally operate much more reliably at the lower peak power level. The theory of range detection of an optically rough target indicates that if a number of statistically independent trials are made for a single range measurement, the probability of detection is generally improved for a given range, signal energy and noise level.

Further objects and advantages of the invention will become apparent upon consideration of the desecription which follows:

DETAILED DESCRIPTION

Figure 1:
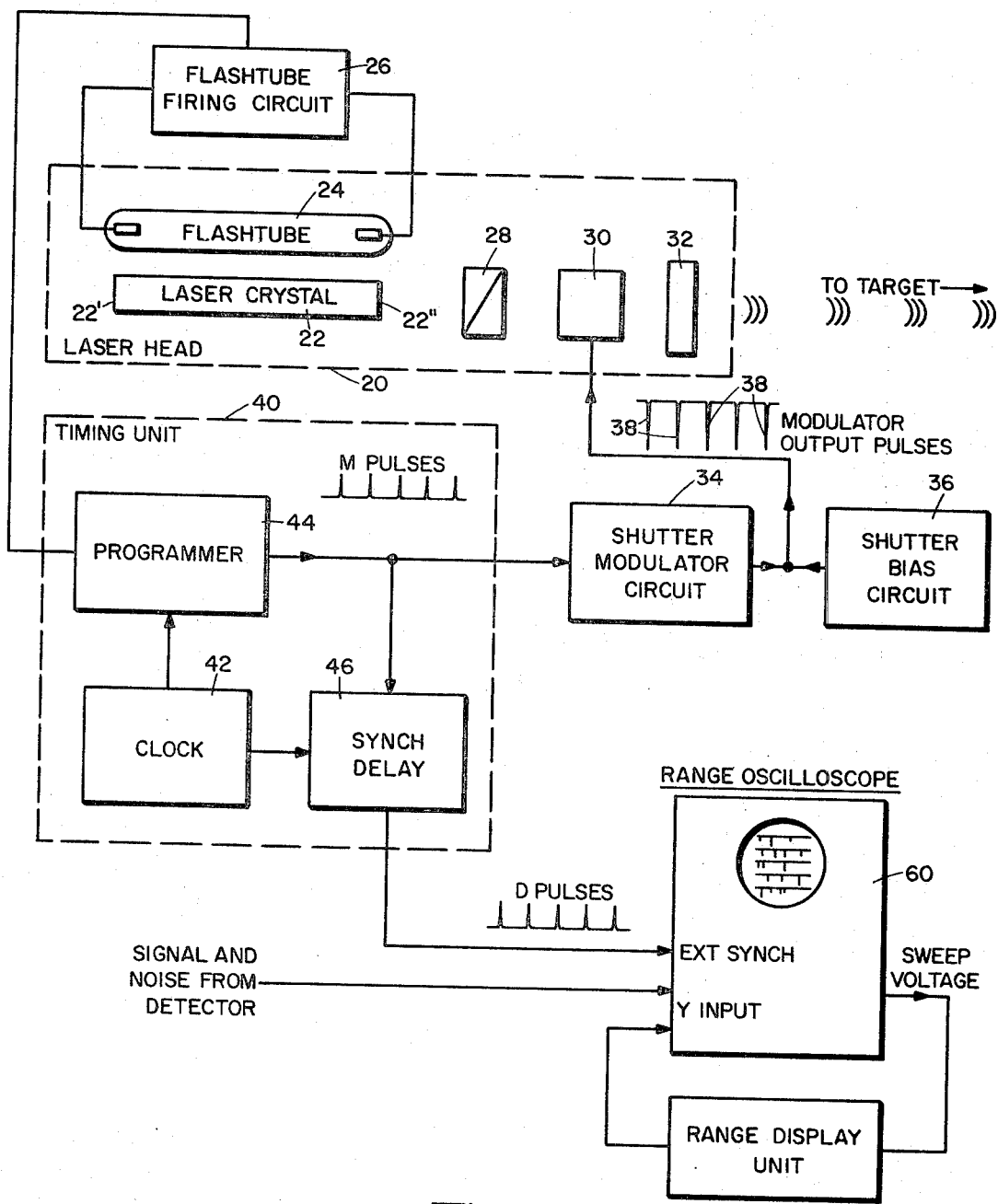
FIG. 1 is a block diagram of the system of the present invention.

FIG. 1 illustrates laser head 20 as comprising laser crystal 22 which may be a conventional ruby rod. In one embodiment of the invention laser crystal 22 was a 60° ruby having a 0.05% concentration by weight of chromium; was ½ inch in diameter by 6 inches long; had plane ends, flat to λ/10 and parallel to within 2 arc-seconds; had a back coating at end 22' for 99% reflectance at 6943 A.; and had a front coating at end 22" for 0.2% reflectance at 6943 A. The laser crystal body surface may be polished or ground. Flashtube 24 pumps ruby rod 22 in the well-known manner. Flashtube firing circuit 26 fires flashtube 24 and is conventional. In the example above, flashtube 24 was a type FX–81–6B manufactured by EG&G, Inc. and flashtube firing circuit 26 included a pulse forming network and series injection triggering (both not shown) to achieve a pumping period of about 0.5 millisecond with about 1800 joules of flashtube energy produced. The pump reflectors, not shown, were cylindrical and split; had an ID of 3¼ inches; and had a 0.010 inch thick silver plate, over 5 micro-inch surface finish.

Aligned axially with laser crystal 22 and spaced successively from end 22″ are Q-switch polarizer 28, Q-switch shutter 30 and front mirror 32, all arranged to permit Q-switching of the laser. In the example heretofore given, Q-switch polarizer 28 was a 15 by 15 millimeter aperture Glan-Thomson prism and Q-switch shutter 30 was a 25 by 15 millimeter aperture Kerr cell. Front mirror 32 may, for example, comprise two quartz etalons, two sapphire etalons or one multi-layer dielectric reflector having 50% reflectance at 6943 A.

Shutter modulator circuit 34 and shutter bias circuit 36 connect to and control Q-switch shutter 30. Normally shutter bias circuit 36 maintains Q-switch shutter 30 closed while shutter modulator circuit 34 is inoperative. However, when shutter modulator circuit 34 is triggered, during a laser pumping period, to produce an output pulse, such as one of the pulses 38, shutter 30 opens and closes, passing a giant laser pulse through front mirror 32. Preferably shutter modulator circuit 34 is a vacuum-tube modulator because it is the only type that operates reliably at fast switching rates of up to 50 kHz.

Timing unit 40 controls flashtube firing circuit 26, shutter modulator circuit 34 and triggers the sweep of range oscilloscope 60. Timing unit 40 comprises clock 42, programmer 44 and synchronous delay 46.

Clock 42 provides a fiducial signal to actuate programmer 44 and synchronous delay 46 at the time desired for commencing a range measurement event. Programmer 44 comprises time and control circuits composed of digital logic driven by a fixed precision oscillator with necessary switch controls for programming the number of events desired. Since the essence of the invention does not reside in programmer 44 its circuit details will not be described. Moreover, its circuitry will be apparent to those skilled in the digital logic art.

Within a short time period after receipt of an input trigger pulse from clock 42 programmer 44 provides a firing pulse to flashtube firing circuit 26. Programmer 44 may be programmed to deliver a predetermined number of such firing pulses which may be equally spaced timewise from, for example, 0.1 to 12 seconds. The time interval between firing pulses may be accurate to within ±5 microseconds with a resolution of 0.1 second.

The time delay of the first M pulse after each firing pulse may be programmed over a range of, for example, 50 to 1,000 microseconds with an accuracy to within 2 microseconds. The number of M pulses and the time intervals between M pulses may be programmed. These time intervals may range from 7 to 200 microseconds, with an accuracy of less than ±50 nano-seconds, delay repeatability less than ±20 nanoseconds, and a resolution of 10 microseconds.

D pulses are synchronous with the M pulses but delayed by synchronous delay 46 by programmable time delays ranging from 1 to 13,000 microseconds. Resolution of these time delays is 0.1 microsecond; time delay accuracy is better than ±25 nanoseconds and time delay repeatability is less than ±5 nanoseconds.

As will be apparent from inspection of FIG. 1 the M pulses occurring after a firing pulse trigger shutter modulator circuit 34 to produce the same number of modulator output pulses 38 during a laser pumping period. The modulator output pulses trigger Q-switch shutter 30 producing the same number of giant laser pulses. The time intervals between M pulses are selected so that the giant laser pulses produced during each pumping period have approximately the same energy and wave-shape.

Figure 2:
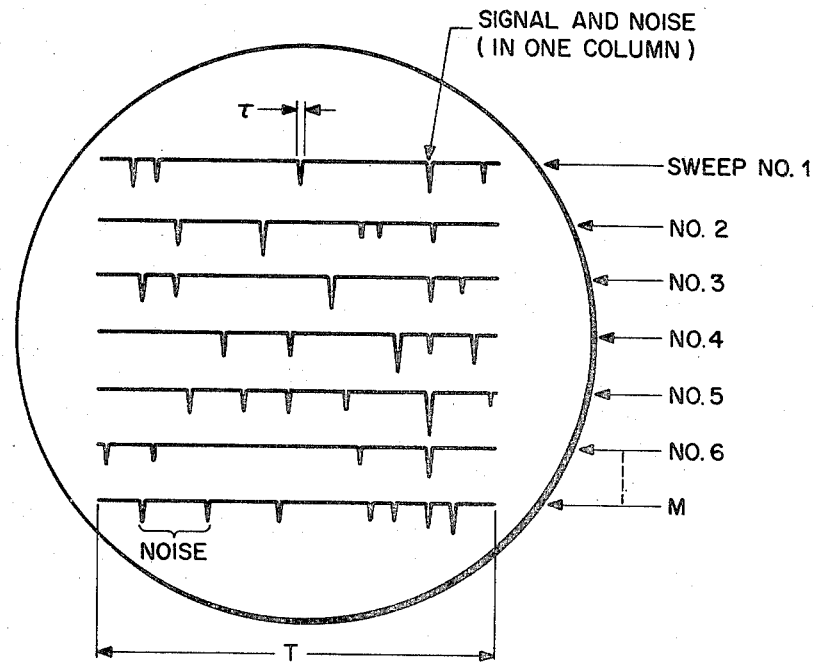
FIG. 2 illustrates an oscilloscope display showing signals received with the system of the present invention.

The D pulses trigger the sweep of range oscilloscope 60. The time duration, T, of the sweep is made equal during each measurement event to the time interval in which the range is in doubt. Note that the programmed time delay between the D and M pulses represents gross range. During the period between D pulses, the range display unit causes the oscilloscope beam to move vertically by an appropriate increment so that the range detector output is displayed as shown in FIG. 2. Note that the number of sweeps displayed is equal to the number of M pulses which, of course, is equal to the number of D pulses. A highly sensitive light detector (not shown) directed toward the target provided reflected laser light signals from the target and noise signals to range oscilloscope 60.

If various pulse-delay uncertainties (jitter) are less than the resolvable time interval $\tau$ (see FIG. 2), and the received signal pulse duration is $\leq \tau$, the intervals $\tau$ which can contain both signal and noise are in a single column of the display ensemble comprising $M(T/\tau)$ elements. Elements that can have only noise energy are randomly distributed. The time to the single column represents "fine" range. Gross range plus fine range equals target range.

When the D pulses are synchronously delayed reproductions of the M pulses this multi-pulse detection system is capable of range accuracies to less than 10 meters if T is not more than a few microseconds and $T/\tau$ is equal to or less than approximately 200.

The exemplary embodiment hereinabove described was exhaustively tested and the results described below were obtained. All the data were taken at a storage network voltage of 3 kv., that is, 2200 joules of stored energy and approximately 1800 joules of flashtube energy. Energy measurements were made at various times with three different instruments: an EG&G Model 580-22 Radiometer, and EG&G Model 560 "Lite Mike" and an IT&T Corporation Type F114-A Biplanar Photodiode (S-20 surface) plus integrator. The measurements made with these instruments agreed within 20%.

The normal-mode output of the system under a number of different conditions is summarized in Table 1. The results shown are in agreement with more than 90% of many measurements made over a period of several months. These data show that the laser output was increased 33% when a polished-silver reflector surface with a 5-microinch finish was substituted for a specular aluminum surface in the cylindrical pumping configuration used. Polished silver has about a 16% higher reflectance than aluminum with an Alzak specular finish in the pumping spectrum. The Kerr cell and polarizer caused a 40% drop in normal-mode laser output. The normal-mode efficiency of the laser itself was about 0.6% near room temperature with the Q-switch installed, and was about 1.0% without it. The overall efficiencies (i.e., with respect to the stored energy) were about 0.48% and 0.80% respectively. Normal-mode lasing generally occurred over a period of about 300 microseconds, or 66% of the pumping period.

TABLE 1.—NORMAL-MODE OUTPUT

| Conditions | Average energy output, joules | Spread, percent |
|---|---|---|
| Specular aluminum reflectors, without Kerr cell or polarizer | 13.5 | ±20 |
| Specular aluminum reflectors, with Kerr cell and polarizer | 8 | ±10 |
| Silver-plated reflectors, without Kerr cell and polarizer | 18 | ±20 |
| Silver-plated reflectors, with Kerr cell and polarizer | 10.5 | ±20 |

NOTE.—Stored energy=2200 joules; estimated inductor, line, an connector losses≅15%.

A number of measurements were made to determine how the normal-mode output would drop due to the temperature rise caused by a number of shots spaced 4 seconds apart without cooling. The average percentage drop in output (referenced to the output of the first shot) is 8%, 13%, 22% and 33% for shot numbers 2, 3, 4 and 5 respectively.

The output energy of Q-switched pulses was measured in the same manner and with the same equipment as the normal-mode output. Relative values of these measurements are therefore expected to be more accurate than the absolute values of either.

Figure 3:
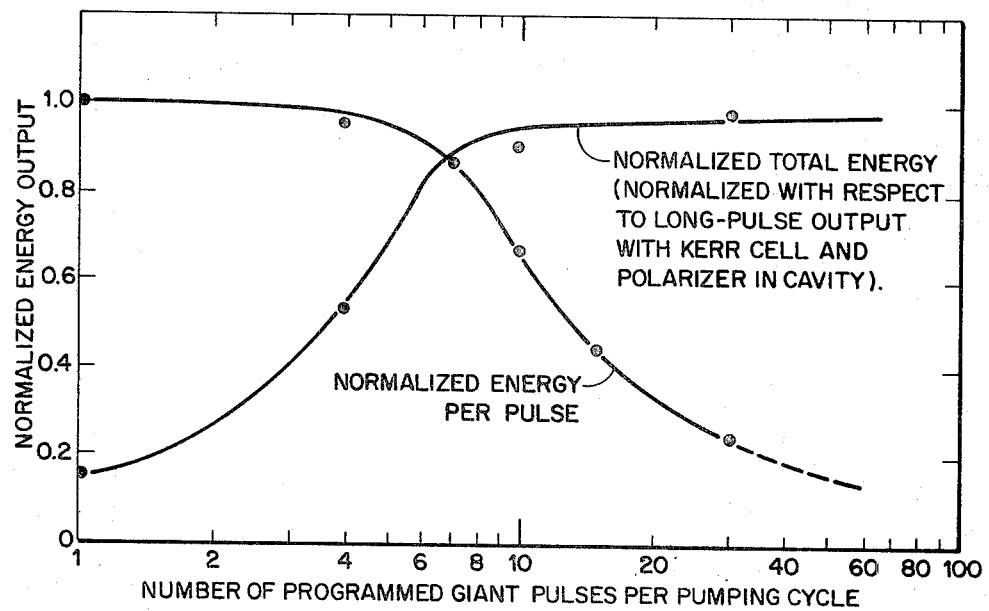
FIG. 3 is a graph illustrating results obtained with an exemplary embodiment of the present invention.

Table 2 is a summary of measurements made to experimentally determine what part of the normal-mode output is extracted in one or more giant pulses, and the energy per pulse. These data are plotted in FIG. 3 in normalized form. It is significant that the efficiency of the laser increases with the number of giant pulses developed during a pumping period, and particularly that the energy per giant pulse remains almost constant up to about 7 pulses when over 80% of the normal-mode output has been extracted. Although this data was taken with a particular laser, it is believed that the normalized results apply to Q-switched ruby lasers in general when operated at or near room temperature. In a general way these results are physically reasonable. The approach to normal-mode output as the number of pulses becomes large can be expected, since this condition is akin to synchronizing the normal-mode spikes. The spread in the output energy per pulse (Table 2) can also be expected to increase as the interval between pulses decreases, due to the statistical nature of the changes in state involved.

TABLE 4.—MULTI-PULSE ENERGY OUTPUT

| Period between giant pulses (30⁻⁹ sec.) | Max. number of pulses | Average energy/ pulse, joules | Total output energy, joules | Spread in energy/pulse, joules |
| --- | --- | --- | --- | --- |
|  | 1 | 1.7 | 1.7 | 1.6–1.8 |
| 65 | 4 | 1.6 | 6.4 | 1.5–1.7 |
| 47 | 6 | 1.6 | 9.6 | 1.5–1.7 |
| 40 | 7 | 1.5 | 10.5 | 1.4–1.6 |
| 27 | 10 | 1.1 | 11.0 | 1.0–1.3 |
| 18 | 15 | 0.8 | 12.0 | 0.5–1.1 |
| 9 | 30 | 0.4 | 12.0 | 0.2–0.7 |

NOTE.—Normal-mode output≃12.0oules; lasing period≃300 microseconds; pumping period≃460 microseconds; stored energy=2200 joules.

A number of measurements were made to determine how the giant pulse energy changes with the temperature rise resulting from a number of closely spaced shots. The shots were spaced 4 seconds apart; no cooling was used, and the crystal was initially at a room temperature of about 80° F. After five shots, the energy in a single giant pulse (per pumping period) increased from 10% to 20% of its initial value. After 5 such shots, the total energy in 5 giant pulses (per pumping period) decreased less than 10%. This is a considerably smaller drop than the 33% change in the normal-mode output under the same conditions. The inverted population losses between pulses and the laser efficiency during a pulse are both functions of the fluorescent efficiency of the crystal. The fluorescent efficiency decreases with rising temperature, and it is assumed that the resulting drop in population losses compensates, or more than compensates, for the lower laser gain. It can be expected that this stabilizing mechanism will be considerably less effective as the multi-pulse energy output approaches more closely that of the normal mode; insofar as temperature stability is concerned, it may be desirable to keep the multi-phase output energy to less than 80% of the normal-mode output.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A laser system for determining the range to a target comprising:
    a Q-switched laser beam with its output directed toward the target;
    means for modulating the Q-switched laser beam a predetermined number of times during each pumping period to produce an equal number of giant laser pulses that are reflected by the target;
    a detector system for detecting light noise and laser pulses reflected by said target and for producing electrical signals corresponding thereto; and
    means for correlating the electrical signals corresponding to said reflected laser pulses with said switching means to ascertain the common time therebetween, said common time representing said range.

2. A laser system as in claim 1 in which said means for modulating the Q-switched laser beam includes a programmable pulse generator.

3. A laser system as in claim 2 in which said correlating means includes;
    a time delay circuit connected to said pulse generator; and
    an oscilloscope system interconnected between said time delay circuit and said detector system.

4. A laser system for determining the range to a target comprising;
    a laser having a pumping flashtube, a flashtube firing circuit and an electro-optical Q-switch axially aligned between its output and the target;
    a modulator connected to the Q-switch and adapted, when triggered by an input pulse, to actuate said Q-switch;
    a programmable pulse generator connected to said flashtube firing circuit and to said modulator, adapted to be programmed to furnish a trigger pulse to actuate the flashtube firing circuit to fire said flashtube thereby producing a laser pumping period, and then to furnish a programmed number of pulses precisely spaced timewise within said laser pumping period to said modulator, each such pulse triggering said modulator to produce a modulator output pulse to actuate said Q-switch producing a giant laser pulse;
    a synchronous delay circuit connected to said pulse generator and adapted to be programmed to delay said number of pulses a predetermined time representing a gross range measurement producing an equal number of delayed pulses;
    a detector system adapted to detect light noise and reflected laser pulses from said target producing electrical signals representing the same; and
    an oscilloscope system interposed between the outputs of said detector system and said delay circuit and adapted to display a number of vertical sweeps each successive sweep being initiated by the next delayed pulse, with the reflected laser pulses representing said giant laser pulses appearing in a vertical column and said light noise appearing as random signals, the time to said column representing a fine range measurement to be added to said gross range measurement.

5. The method of measuring range with a Q-switched laser comprising;
   switching the Q-switch by means of a predetermined number of pulses during a single pumping period to produce an equal number of giant laser pulses directed to and reflected from the target;
   synchronously producing an equal number of pulses delayed a predetermined time representing gross range;
   receiving said reflected laser pulses and noise signals; and
   correlating said reflected laser pulses and noise signals with respect to said delayed pulses to ascertain the common time between each delayed pulse and its corresponding reflected laser pulse, said common time representing fine range to be added to said gross range.

References Cited
UNITED STATES PATENTS 3,380,358  4/1968  Neumann _____ 356—5X
3,402,630  9/1968  Blau et al.

RODNEY D. BENNETT, Primary Examiner

J. G. BAXTER, Assistant Examiner

U.S. Cl. X.R.

356—4